Figure 1:
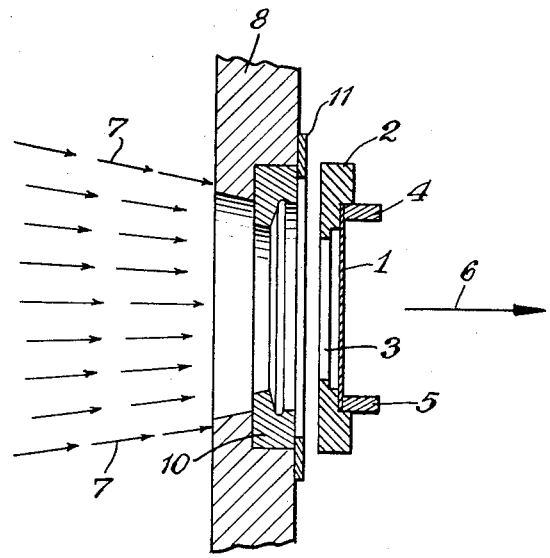

Oct. 20, 1959     H. ULFFERS     2,909,095

MOTION PICTURE PROJECTORS

Filed Aug. 31, 1954

INVENTOR.

Heinz Ulffers

BY

Singer, Stern & Carlberg

Attorneys

United States Patent Office 2,909,095
Patented Oct. 20, 1959

2,909,095

MOTION PICTURE PROJECTORS

Heinz Ulffers, Kiel-Wik, Germany, assignor to Zeiss Ikon A.G., Stuttgart, Stuttgart, Germany Application August 31, 1954, Serial No. 453,274

Claims priority, application Germany September 3, 1953

3 Claims. (Cl. 88—17)

In the projection of conventional motion picture film having a width of 35 mm., there is employed in the projector a picture window of 20.9 mm. width and a height of 15.2 mm. In projecting a so-called panorama picture, there have been employed 35 mm. films which at a conventional picture height produce a substantially wider picture on the screen in order to obtain thereby an increase in the three dimensional effect of the picture. This desired wider projection picture can be produced by two methods differing essentially from each other.

According to one method, the picture window of the projection is reduced in height, while the width of the window remains unchanged, so that the ratio of picture-width to picture-height is increased. This picture window, reduced in its height, is projected through an objective having a shorter focal length in comparison with the conventional focal length. While in the conventional size the ratio of the picture sides, also called the picture or aspect ratio, amounts to 1.37, in the panorama type projection this ratio reaches values up to 1.85, which corresponds to a picture window of 20.9 x 11.3 mm.

Another method of panorama projection employs a picture window somewhat enlarged in comparison to the conventional window and has a size of 23.16 x 18.16 mm. This picture window is expanded to double the picture width with its height unchanged by a suitable projection objective which is complemented by an anamorphotic supplementary system. This panorama projection method produces a picture ratio of 2.55.

In order to be able to use the same motion picture projector for both the projection of a standard film and the projection of the various panorama films mentioned above, the film guide insert is exchanged together with the picture window required in each case.

Present day motion picture projectors are equipped with a diaphragm called the outer window in order to prevent the film guide insert, generally made of thin sheet-steel, from heating up unduly and thus damaging the film. This outer window is normally rigidly built into the projector housing and collects those portions of the radiation which are not utilized for the picture projection. The considerable heat quantities absorbed thereby are either taken away by a water cooling system and/or dissipated by the projector housing by heat transmission and heat radiation. This task assigned to the outer window can be performed the better the closer the passageway of said outer window will be adjusted to the window of the projector. Since the exchangeable film guide inserts have to be provided with different picture window openings according to the above explanations and since the outer window is firmly installed in the projector, the size of said outer window must always be selected in accordance with the largest picture window to be employed. There exists thus the danger that the film guide insert and consequently the film itself are projected having a picture ratio which differs from the ratio found in the dimensions of the outer window. This additional heating action leads to a more rapid aging of the film and causes a greater curving of the film in the picture window which makes itself known by a considerable deterioration in focus and image-sharpness, particularly with objectives of short focal length as used in panorama projection having a very low depth of focus. Since in the projection of panoramic pictures much more powerful luminous sources are required than for conventional projection, there is thus also involved an increase in undesirable heat which enhances still more the distortion of the film and thus intensifies considerably the lack of sharpness of the picture appearing on the screen.

It is an object of the invention to eliminate these disadvantages by making the outer window of the projector interchangeable whereby in a simple and exact manner the outer window can be adapted to the picture window present in the insert.

It is a further object of the invention to employ this interchangeable outer window as a holder for an image field lens. Such picture window lenses serve for improving the illumination of objectives having a short focal length. It then will be advisable to place the size limitation of the interchangeable outer window behind the image field lens looking in the direction of the projection, while the opening of the outer window in front of the image field lens is symmetrically formed to the image field lens present in the insert so that said lens is subjected to a uniform thermal load, a necessary prerequisite for avoiding cracks in the lens body.

Figure 2:
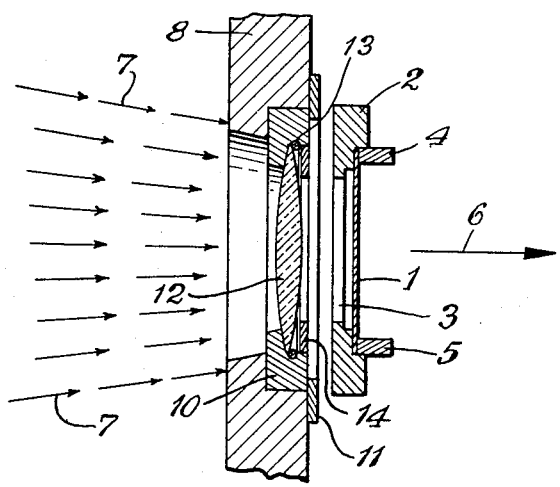

The invention will now be more particularly described by way of example with reference to the accompanying drawings, in which:

Fig. 1 shows a horizontal cross-section of part of a projector provided with an interchangeable outer window according to the invention, and Fig. 2 is a similar view, showing an outer window additionally formed as holder for a lens.

Referring to Fig. 1, the film 1 is guided by a film gate which is formed by an interchangeable film guide insert 2 provided with a picture window 3 and of two pressure strips 4 and 5. These strips are urged by springs against the perforated margins of the film. The arrow 6 indicates the direction of the projection, while 7 represents the border lines of the projection light beam, the cross section of said beam always being greater than the one of the picture window in order to obtain a uniformly good illumination of said window. The numeral 8 designates a wall of the housing of the projector, which wall has installed therein the outer window which hitherto was formed by a fixed unchangeable opening. In order to adapt the picture window to different ratios of the picture sides, the outer window is formed by an interchangeable slide 10 having an opening therein which corresponds to the picture size to be projected. The slide 10 is secured in its position by the mounting bar 11 which is secured to the housing wall and forms a guide for the insertion of the slide 10.

According to the embodiment of the invention shown in Fig. 2, the slide 10 may at the same time be formed as a holder for the image field lens 12 which is secured in its position by the spring ring 13. In order to avoid in this arrangement an uneven heating of the lens body, the rectangular aperture forming picture area is formed in an insert 14 arranged behind the image field lens, looking in the direction of projection, while the lens mounting element arranged ahead of this lens is circularly formed according to the shape of said lens.

What I claim is:

1. In a motion picture projector, a front wall section having an opening therein to allow passage of a light beam to a screen, a film gate mounted on the screen side of said wall section and spaced therefrom to prevent excessive heat transfer to the film gate, said film gate including an interchangeable film guide insert having a picture window therein in register with said opening in the wall section, parallel guideways in said wall section at opposite sides of said opening therein, an outer window slidably and removably mounted in said guideways and having an opening therein, a field lens mounted in the opening of said outer window, and a frame insert mounted in said outer window and having a light beam contouring aperture therein whereby outer windows with frame inserts of different light beam contouring apertures corresponding to the picture window in the film guide insert may be interchangeably received in said guideways.

2. The motion picture projector as set forth in claim 1, wherein the opening in said outer window is circular.

3. The motion picture projector as set forth in claim 1, wherein said frame insert is disposed at the screen side of said field lens.

References Cited in the file of this patent

UNITED STATES PATENTS

| | | |
|---|---|---|
| 1,236,319 | Kleidman | Aug. 7, 1917 |
| 1,302,802 | Jenkins | May 6, 1919 |
| 1,342,561 | Mengel | June 8, 1920 |
| 1,662,057 | Hadley | Mar. 13, 1928 |
| 1,758,689 | Del Riccio | May 13, 1930 |
| 1,981,033 | Dina | Nov. 20, 1934 |
| 2,162,324 | Worrall | June 13, 1939 |
| 2,238,159 | Derossi | Apr. 15, 1941 |
| 2,315,914 | Wengel | Apr. 6, 1943 |
| 2,464,887 | Osterberg et al. | Mar. 22, 1949 |
| 2,477,896 | Pratt | Aug. 2, 1949 |
| 2,493,612 | Blanchet | Jan. 3, 1950 |
| 2,556,769 | Miller | June 12, 1951 |
| 2,688,271 | Gretener | Sept. 7, 1954 |
| 2,773,417 | Ulffers | Dec. 11, 1956 |

FOREIGN PATENTS

| | | |
|---|---|---|
| 724,176 | France | Jan. 25, 1932 |
| 528,719 | Great Britain | Nov. 5, 1940 |
| 122,158 | Sweden | July 6, 1948 |